United States Patent
Queck et al.

(10) Patent No.: US 8,655,113 B2
(45) Date of Patent: Feb. 18, 2014

(54) METHOD AND SYSTEM FOR DETERMINING VALIDITY OF A PRINTED DOCUMENT

(75) Inventors: Tobias Queck, Mountain View, CA (US); Sebastian Steinhauer, Santa Clara, CA (US)

(73) Assignee: SAP AG, Walldorf (DE)

( * ) Notice: Subject to any disclaimer, the term of this patent is extended or adjusted under 35 U.S.C. 154(b) by 349 days.

(21) Appl. No.: 13/096,575

(22) Filed: Apr. 28, 2011

(65) Prior Publication Data

US 2012/0275726 A1    Nov. 1, 2012

(51) Int. Cl.
*G06K 9/22* (2006.01)

(52) U.S. Cl.
USPC .......................................... 382/314

(58) Field of Classification Search
USPC .......... 358/403, 474, 505; 382/135, 137, 140, 382/176, 282, 314; 705/35, 36, 408.3; 715/200, 230

See application file for complete search history.

(56) References Cited

U.S. PATENT DOCUMENTS

| | | | |
|---|---|---|---|
| 7,546,524 B1 * | 6/2009 | Bryar et al. | 715/230 |
| 7,958,147 B1 * | 6/2011 | Turner et al. | 707/783 |
| 2008/0277470 A1 * | 11/2008 | Gallaher et al. | 235/386 |

\* cited by examiner

*Primary Examiner* — Gregory F Cunningham

(74) *Attorney, Agent, or Firm* — Schwegman Lundberg & Woessner, P.A.

(57) ABSTRACT

A method and system to determine validity of a printed document is provided. An example system comprises a validation module and an alert module. The validation module may be configured to detect, using a scanning device, a document identification associated with a printed document and determine, based on the document identification, a state of the electronic document The alert module may be configured to trigger an alert, based on the determined state of the electronic document.

20 Claims, 6 Drawing Sheets

METHOD AND SYSTEM FOR DETERMINING VALIDITY OF A PRINTED DOCUMENT

TECHNICAL FIELD

This application relates to the technical fields of software and/or hardware technology and, in one example embodiment, to system and method to determine validity of a document.

BACKGROUND

Preparation of a legal document, such as, e.g., a written contract, may involve a number of revisions resulting from negotiation between the parties to the contract. During this process, several electronic versions of the document may be created, culminating in the final document that can be printed out and signed by one or more interested parties. A legal document may be negotiated by the parties' representatives rather than by the parties themselves. The final electronic version of the document that is intended for signature by the person responsible for the consequences of the legal document is typically printed out and then signed.

While the final electronic version of a legal document may be readily identifiable as such (e.g., based on the date of the document, the name with its assigned version number, etc.) the printed out hard copy of the final version may not be readily distinguished from earlier non-final versions of the document. Consequently, the signer may wind up signing a document that is not the correct or final version. Furthermore, in the process of perfecting a document through revisions, the name of the undersigned on the document may change, such that an earlier version of the document may indicate an undersigned that no longer have sufficient rights to sign the document, while the originally-designated signer might not be aware of this fact. Still further, the interest of a party with respect to a legal document may expire, e.g., as in the case where the legal document is an offer letter or a service offering. This expiration information might not be part of the document text itself but might be information that the designated signer is not aware of.

In some existing systems, a unique two-dimensional barcode may be printed on a document page in addition to the content of the document. The two-dimensional barcode can be scanned with a barcode reader. The barcode reader may then communicate with an enterprise system and validate the document. A smart phone with a camera may also be used as barcode reader, provided the smart phone is executing an appropriate mobile application capable of comparing the scanned barcode against reference barcodes stored in a validation database.

BRIEF DESCRIPTION OF DRAWINGS

Embodiments of the present invention are illustrated by way of example and not limitation in the figures of the accompanying drawings, in which like reference numbers indicate similar elements and in which.

DETAILED DESCRIPTION

Figure 1:
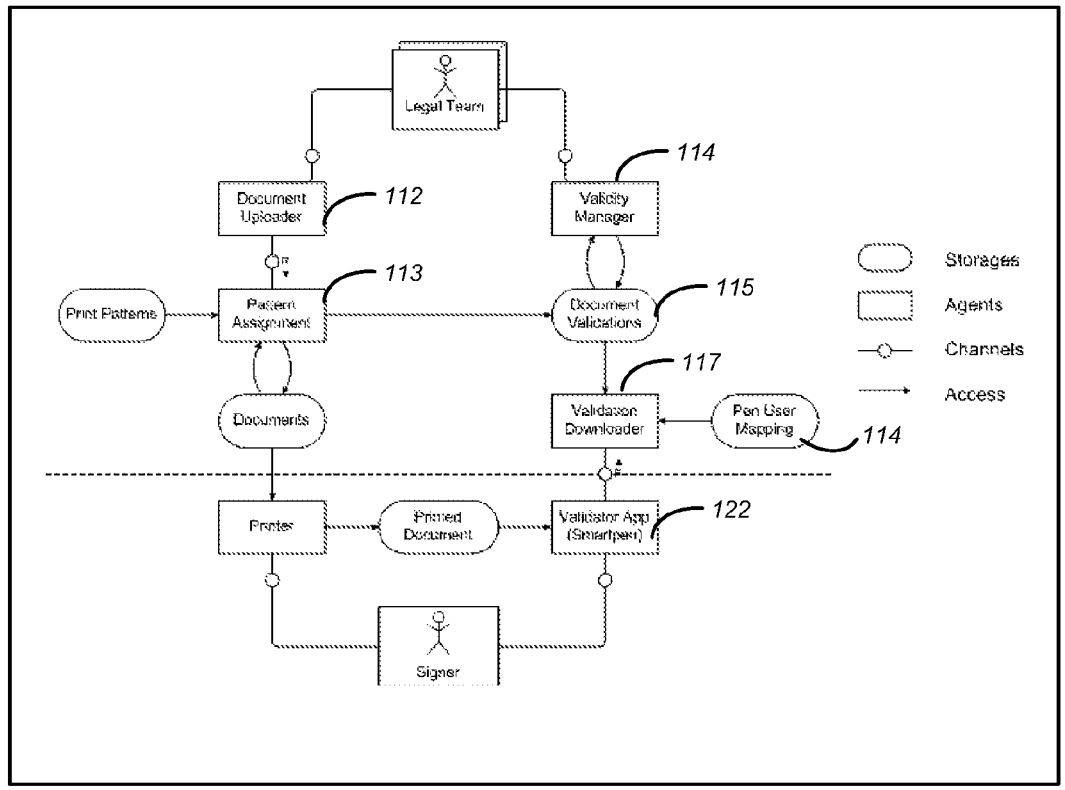
FIG. 1 is a diagrammatic representation of an example architecture within which an example method and system to determine validity of a printed document may be implemented.

A method and system to determine validity of a printed document is described. In the following description, for purposes of explanation, numerous specific details are set forth in order to provide a thorough understanding of an embodiment of the present invention. It will be evident, however, to one skilled in the art that the present invention may be practiced without these specific details. As used herein, the term "or" may be construed in either an inclusive or exclusive sense. Similarly, the term "exemplary" is construed merely to mean an example of something or an exemplar and not necessarily a preferred or ideal means of accomplishing a goal. Additionally, any type of server environment, including various system architectures, may employ various embodiments of the application-centric resources system and method described herein and is considered as being within a scope of the present invention.

Method and system to determine validity of a printed out copy of an electronic document may be implemented in conjunction with a pen-based computer system, e.g., as a feature of an digital pen. An digital pen, typically, has a scanning device that can be used to scan dot-enabled paper (also termed "electronic paper"). The dot pattern of the dot-enabled paper provides an absolute and relative reference for a scanning device.

In one example embodiment, where an electronic document undergoes one or more revisions and different versions of the electronic document are stored in a computer-implemented document repository, each new version of the electronic document is assigned a unique dot pattern. Each version of the electronic document is also associated with metadata that may be used to determine validity of that particular version. For example, the metadata stored as associated with a version of an electronic document and its unique dot pattern may include information indicating a list of users that are authorized to sign the associated document, the version information (e.g., whether there are earlier and/or later versions of the document), a general validity flag that can be set to invalidate the version of the document, an expiration date (e.g., after which the document is not to be signed), etc. This metadata stored as associated with a version of an electronic document may be termed validity information.

Validity information may be downloaded, from a server computer system executing a document management application, to an digital pen. Downloaded validity information may be periodically synchronized with the data stored at the server computer system, using, e.g., a wired or wireless communications protocol. In some embodiments, versions of an electronic documents and the respective validity information may be stored in a mobile device, such as, e.g., a smart phone, and the validity information may be downloaded from the mobile device.

To determine validity of the printed document before signing, the prospective signer just needs to tap the printed document with his/her digital pen, and an application executing on the digital pen would check whether the dot pattern provided on the printed document is mapped to an electronic document version that is still valid and whether the prospective signer has adequate rights to sign it. Depending on the output features of the digital pen, a colored light-emitting diode (LED), a small screen, or an audio output may be used to notify the prospective signer about the validity of the printed document. In some embodiments, an digital pen may be configured to interrupt the ink flow of the digital pen if the printed document was determined to be invalid.

In operation, when an electronic document is printed out and a user taps the printed document with her digital pen, digital pen detects the dot pattern printed on the paper document and, based on the detected dot pattern, determines a document identification. A validation application executing in the digital pen accesses and examines validity information associated with the document identification and triggers an alert (e.g., an audio signal or a light) indicative of validity or invalidity of the printed document.

Example architecture 100 for determining validity of a printed document is illustrated in FIG. 1. The upper part of FIG. 1, shown above the broken horizontal line, shows the components that are running within the information technology (IT) landscape of an enterprise. The lower part, shown below the broken horizontal line, shows the peripheral components that are acting as gateways between the digital representation and physical representation (paper and ink) of documents.

Each document that is uploaded through a document uploader 112, a pattern assignment component 113 combines with a unique dot pattern and makes it available for printing. Using a validity manager 114, additional validation rules can be assigned to any of the uploaded documents. Additionally, if a document is updated (e.g., new version is uploaded) the pattern assignment component 113 automatically calls a document validations component 115 that invalidates the old version of the updated document.

Electronic documents stored in a document management system implemented within the architecture 100 can be printed with a standard printer. There are no specific requirements but that the printer has a sufficient print resolution. An digital pen (also referred to as a smart pen) that the signer owns and uses has a unique hardware identification (pen identification). The unique pen identification may be used by a validator application 122 executing on the digital pen to examine validation information of an electronic document. For example, a pen identification may be mapped to a user identification of a prospective signer and included in to the validation information of an electronic document. If the validation information of an electronic document indicates that a prospective signer associated with a user identification mapped to a certain pen identification does not have a right to sign a printed version of the electronic document, the of the electronic document may trigger an alert indicating that the validation failed.

The validator application 122 executing on the digital pen may be configured to synchronize validation information stored on the digital pen with corresponding information stored by a document management system executing within the enterprise's IT landscape, utilizing a validation downloader 117, either on a regular basis on request of the pen's user. The synchronization may be performed either over the wire (e.g., via a universal serial bus (USB) cable) or wirelessly, e.g., using Bluetooth®, Wi-Fi or any other radio transmission protocol.

Suggested format for data exchanged between the validation downloader 117 and the validator application 122 is shown in Table 1 below.

TABLE 1

PatternId (Long)
Validaty (Boolean)
SignerList (Array of pen ids)
ValidatyInformation:
    VersionNumber (Integer)
    NewestVersion (Integer)
    ExpirationDate (Date)
    ManualInvalidation (String)

When a signer want to sign a document i.e. the pen is tap on the document, the Validation App automatically recognizes the pattern and checks the validity information about the document that is assigned to the recognized pattern. The application will return a positive or a negative outcome of the validation check. The validation check may include the steps shown in Table 2 below.

TABLE 2

1. Load validation information for the detected dot pattern
2. Check whether the user of this pen (the pen having the determined pen identification) is allowed to sign this document
3. If not, stop here and return "invalid" status
4. Check if this document has "valid" status
5. If yes, return "valid" status
6. Check the reason for the invalidity
   a. Expiration Date reached
   b. Newer version available
   c. Other manually added invalidity reason detected
7. Return reason for invalidity This outcome of the validation sequence performed by the validator application 122 is communicated to the prospective signer. The output channel may be selected based on the features of the digital pen. As mentioned above, if the digital pen just has LEDs, the positive outcome of the validation sequence could be mapped to green light and negative outcome of the validation sequence could be mapped to red light. Some digital pens have a vibration feature which could be used to signal an invalid document. Some digital pens are equipped with a small text output display, which could be used to provide further information explaining the reason for the determination of invalidity. Additionally, if the digital pen has an audio output, the validator application 122 may be configured to cause playing a recorded warning audio message. As also was mentioned above, the ink supply could be interrupted whenever the pen is tapped to an invalid document.

Figure 2:
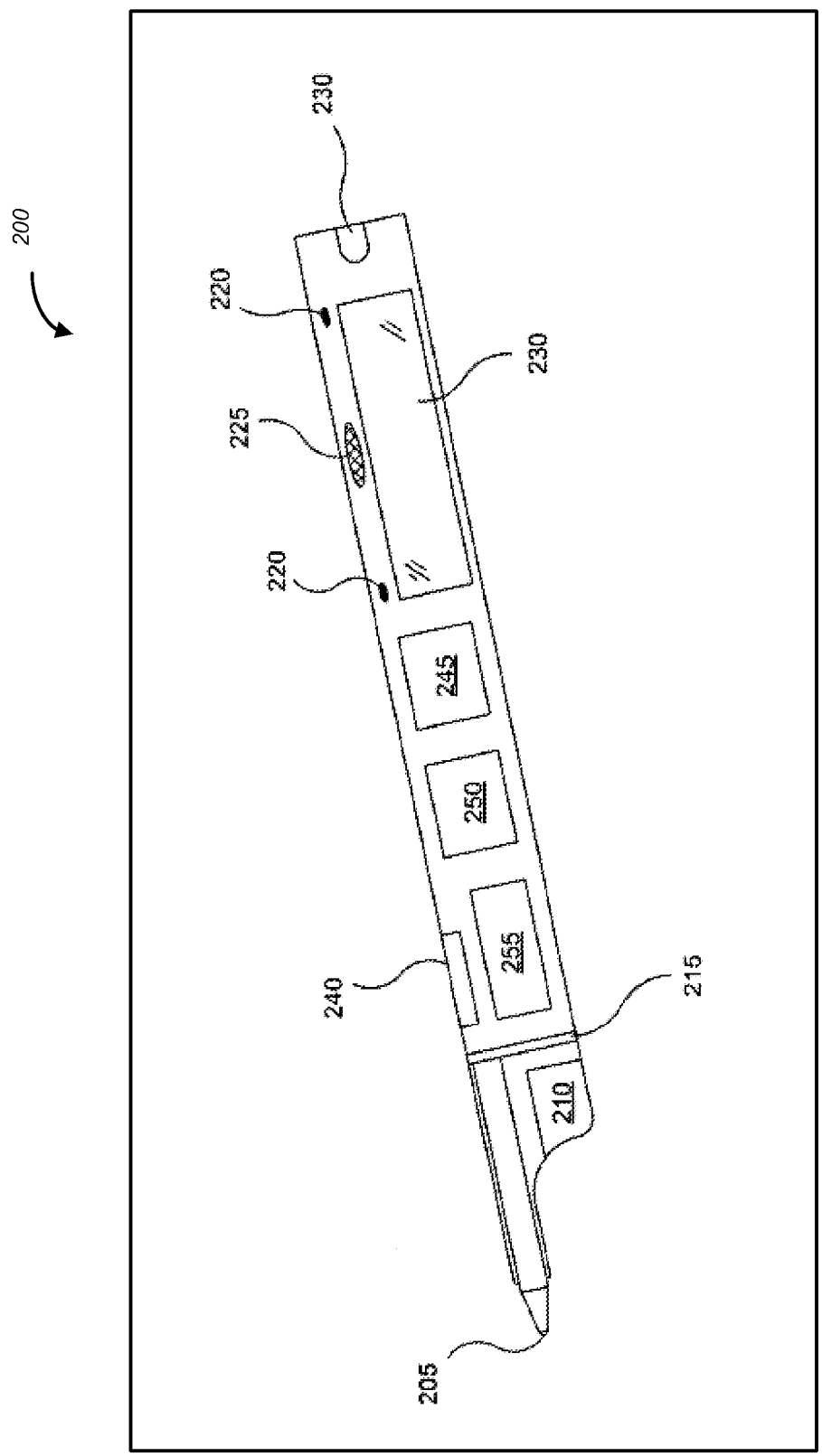
FIG. 2 is a diagrammatic representation of an digital pen within which an example method and system to determine validity of a printed document may be implemented.

FIG. 2 is a diagram of a smart pen 200 (also referred to as an digital pen. The smart pen 200 is designed to work with this dot enabled paper and includes an imaging system and a processor that can determine the position of the smart pen's writing tip with respect to the dot pattern. In various embodiments, the smart pen 200 can communicate with a general purpose computing system, such as a personal computer or a mobile computer system. For example, content captured by the smart pen 200 may be transferred to the computing system for further use by that system. Conversely, content may also be transferred back onto the smart pen 200 from the computing system. In addition to data, the content provided by the computing system 220 to the smart pen 200 may include software applications that can be executed by the smart pen 200. The smart pen 200 may communicate with the computing system via any of a number of known communication mechanisms, including both wired and wireless communications. As shown in FIG. 2, the smart pen 200 comprises a marker 205, an imaging system 210, a pen down sensor 215, one or more microphones 220, a speaker 225, an audio jack 230, a display 235, an I/O port 240, a processor 245, an onboard memory 250, and a battery 255. It should be understood, however, that not all of the above components are required for the smart pen 200, and this is not an exhaustive list of components for all embodiments of the smart pen 200 or of all possible variations of the above components. For example, the smart pen 200 may also include buttons, such as a power button or an audio recording button, and/or status indicator lights. Moreover, as used herein in the specification and in the claims, the term "smart pen" does not imply that the pen device has any particular feature or functionality described herein for a particular embodiment, other than those features expressly recited. A smart pen may have any combination of fewer than all of the capabilities and subsystems described herein.

The marker 205 enables the smart pen to be used as a traditional writing apparatus for writing on any suitable surface. The marker 205 may thus comprise any suitable marking mechanism, including any ink-based or graphite-based marking devices or any other devices that can be used for writing. In one embodiment, the marker 205 comprises a replaceable ballpoint pen element. The marker 205 is coupled to a pen down sensor 215, such as a pressure sensitive element. The pen down sensor 215 thus produces an output when the marker 205 is pressed against a surface, thereby indicating when the smart pen 200 is being used to write on a surface.

The imaging system 210 comprises sufficient optics and sensors for imaging an area of a surface near the marker 205. The imaging system 210 may be used to capture handwriting and gestures made with the smart pen 200. For example, the imaging system 210 may include an infrared light source that illuminates a writing surface in the general vicinity of the marker 205, where the writing surface includes an encoded pattern. By processing the image of the encoded pattern, the smart pen 200 can determine where the marker 205 is in relation to the writing surface. An imaging array of the imaging system 210 then images the surface near the marker 205 and captures a portion of a coded pattern in its field of view. Thus, the imaging system 210 allows the smart pen 200 to receive data using at least one input modality, such as receiving written input. The imaging system 210 incorporating optics and electronics for viewing a portion of the writing surface is just one type of gesture capture system that can be incorporated in the smart pen 200 for electronically capturing any writing gestures made using the pen, and other embodiments of the smart pen 200 may use any other appropriate means for achieve the same function.

A processor 245, onboard memory 250, and battery 255 (or any other suitable power source) enable computing functionalities to be performed at least in part on the smart pen 200. The processor 245 is coupled to the input and output devices and other components described above, thereby enabling applications running on the smart pen 200, such as, e.g., the validator application 122 of FIG. 1, to use those components. In one embodiment, the processor 245 comprises any suitable processor, and the onboard memory 250 comprises a small amount of random access memory (RAM) and a larger amount of flash or other persistent memory. As a result, executable applications can be stored and executed on the smart pen 200. In an embodiment, the processor 245 and onboard memory 250 include one or more executable applications, such as a system for determining validity of a printed document (e.g., the validator application 122). An example method and system may be implemented in the context of a network environment 300 illustrated in FIG. 3.

Figure 3:
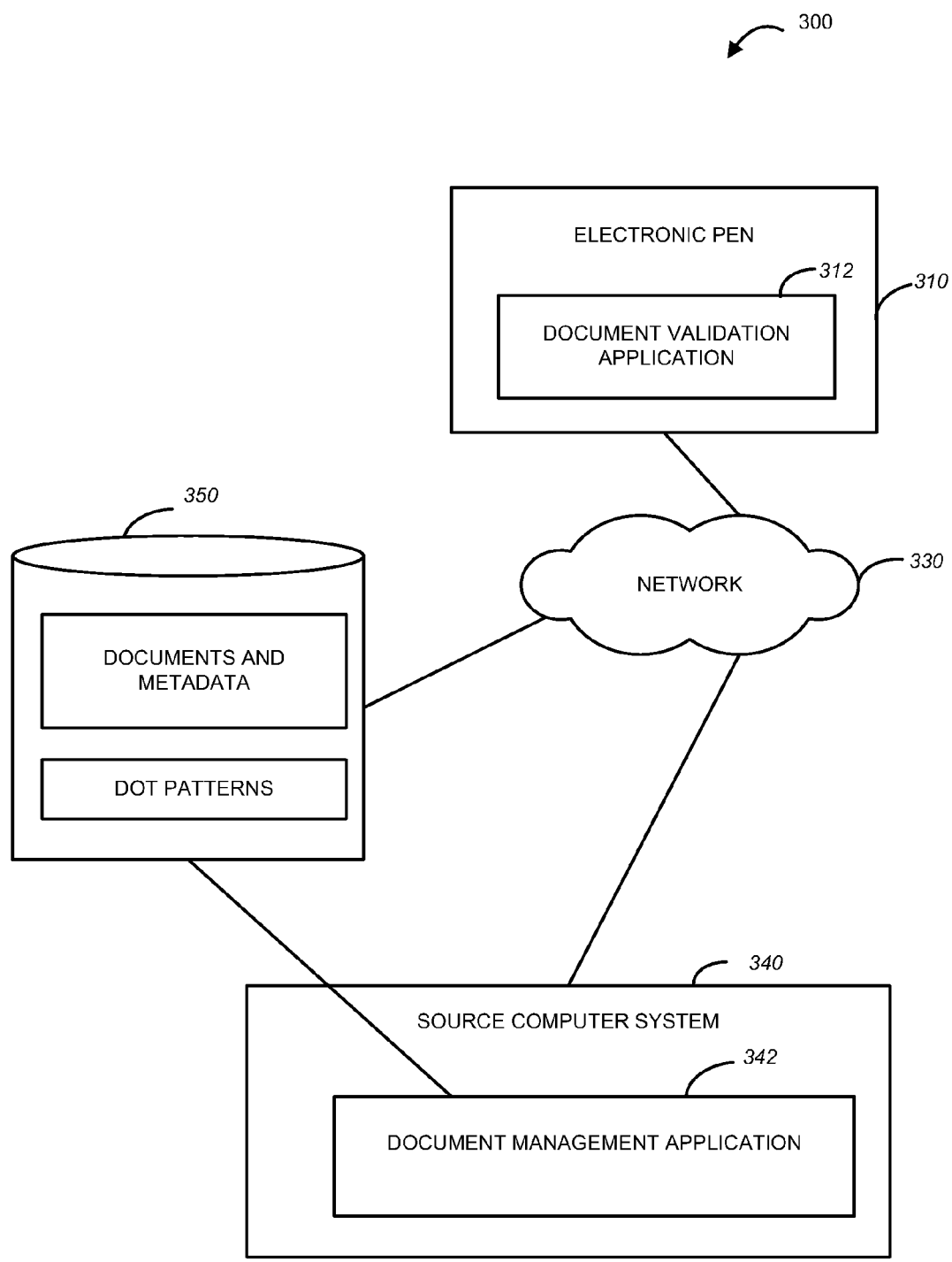
FIG. 3 is a diagrammatic representation of a network environment within which an example method and system to determine validity of a printed document may be implemented.

As shown in FIG. 3, the network environment 300 may include an digital pen 310 and a source computer system 340. The source computer system 340 may be a server computer system or a mobile computing device, such as, e.g., a smart phone. The digital pen 310, in one embodiment, corresponds to the digital pen illustrated in FIG. 2. The source computer system 340, in one example embodiment, may be executing a document management application 342 that may be in communication with the digital pen 310 via a communications network 330. The communications network 330 may be a public network (e.g., the Internet, a wireless network, etc.) or a private network (e.g., a local area network (LAN), a wide area network (WAN), Intranet, etc.). The digital pen 310 may be executing a document validation application 312 (that may correspond to the validator application 122 of FIG. 1). The document management application 342 executing on the source computer system 340 may be used to upload, to the digital pen 310, validity information associated with a plurality of electronic documents. The electronic documents may be stand-alone unrelated documents or may be related as different versions/revisions of a document. The digital pen 310 may be configured to scan and identify printed documents that include respective dot patterns.

As shown in FIG. 3, the document management system 342 is connected to a database 350 that may store electronic documents with their respective metadata, as well as dot patterns. As explained above, an identification of an electronic document may be mapped to a unique dot pattern, so that the document validation application may be configured to access validity information of an electronic document (stored as metadata) based on the identified dot pattern of a printed document. An example system to determine validity of a printed document may be described with reference to FIG. 4.

Figure 4:
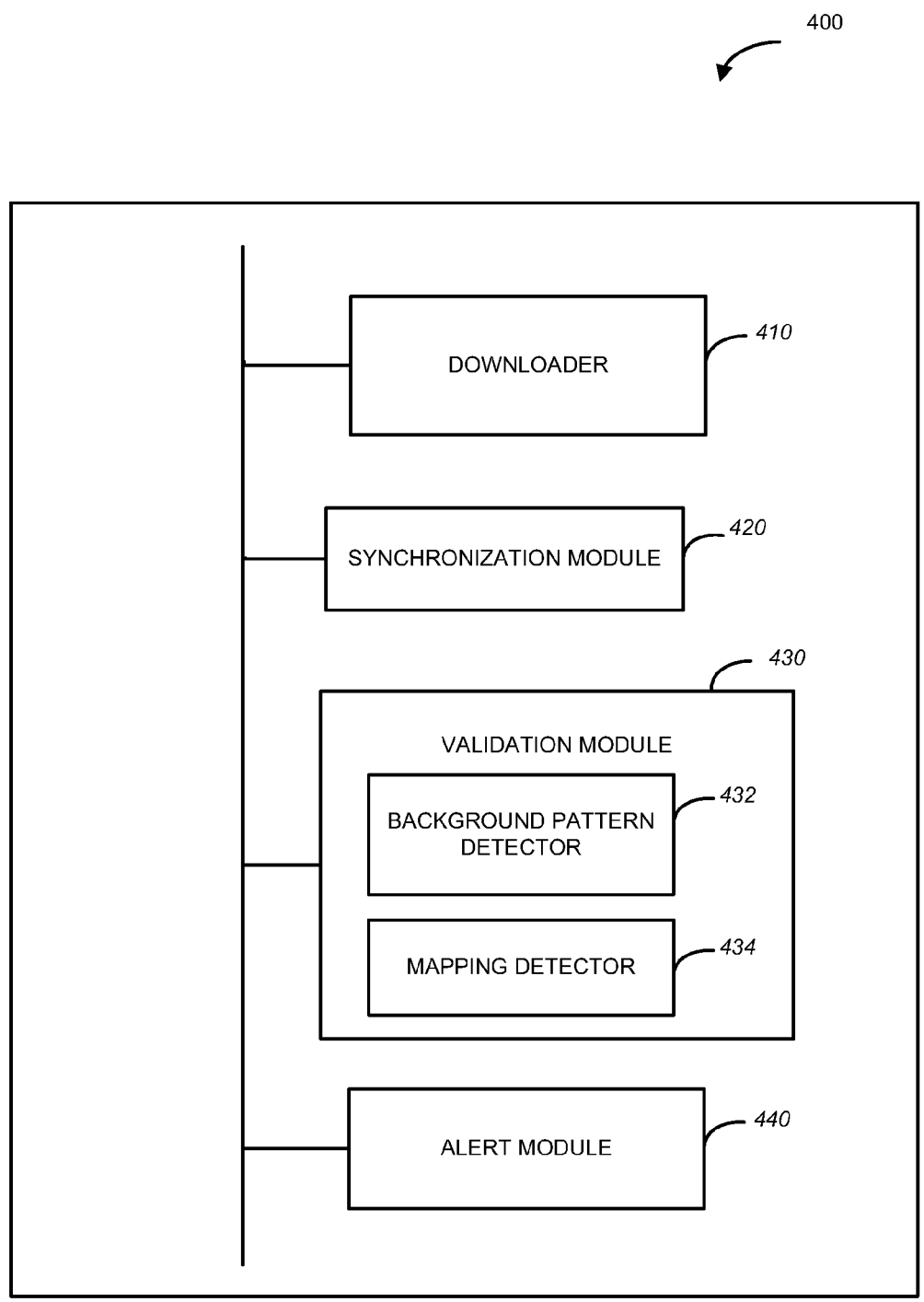
FIG. 4 is block diagram of a system o determine validity of a printed document, in accordance with one example embodiment.

FIG. 4 is a block diagram of a system 400 to determine validity of a printed document, in accordance with one example embodiment. As shown in FIG. 4, the system 400 includes a downloader 410, a synchronization module 420, a validation module 430, and an alert module 440. The downloader 410 may be configured to download, from a computer executing a document management application, data associated with one or more electronic documents. The synchronization module 430 may be configured to synchronize the downloaded data with data stored at the computer executing the document management application.

The validation module 430 may be configured to detect, e.g., using a scanning device, a document identification associated with a printed document. The document identification may be stored electronically, at a storage location accessible by the system 400, as associated with an electronic document and its validity information. The validation module 430 may further be configured to determine, based on the document identification, a state of the electronic document that corresponds to the printed document.

As shown in FIG. 4, the validation module 430 comprises a background pattern detector 432 and a mapping detector 434. The background pattern detector 432 may be configured to identify a background pattern associated with the printed document. The mapping detector 434 may be configured to access mapping information that provides a mapping between the background pattern and the document identification. The mapping information is stored as part of validity information of an electronic document.

The alert module 440 may be configured to trigger an alert based on the determined state of the electronic document. For example, if the validation module 420 determines, by examining validity information of an electronic document, that the printed document corresponds to an invalid electronic document or to an electronic documents for which the user of the digital pen does not have sufficient signatory rights, the alert module 440 may trigger an audio or a visual alert, or even interrupt the ink flow to the digital pen to prevent the user of the pen from signing the printed document. Various modules illustrated in FIG. 4 may be implemented as software, hardware, or a combination of software and hardware, utilizing at least one processor. An example method to determine validity of a printed document can be described with reference to FIG. 5.

Figure 5:
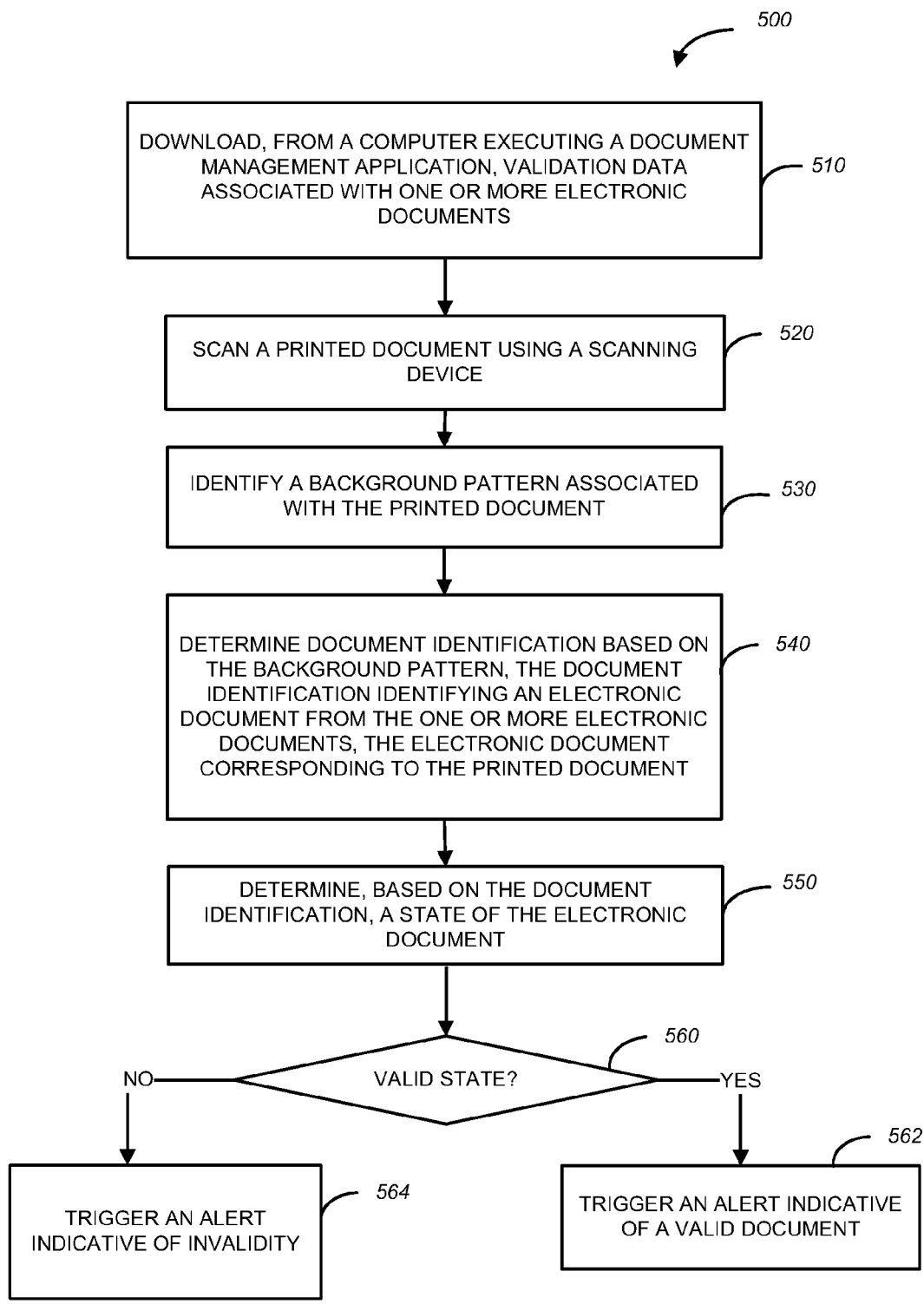
FIG. 5 is a flow chart of a method o determine validity of a printed document, in accordance with an example embodiment.

FIG. 5 is a flow chart of a method 500 to determine validity of a printed document, according to one example embodiment. The method 500 may be performed by processing logic that may comprise hardware (e.g., dedicated logic, programmable logic, microcode, etc.), software (such as run on a general purpose computer system or a dedicated machine), or a combination of both. In one example embodiment, the processing logic resides at the digital pen 200 of FIG. 2 and, specifically, at the system 400 shown in FIG. 4.

As shown in FIG. 5, the method 500 commences at operation 510, when the downloader 410 of FIG. 4 (that is executing at an digital pen) downloads, from a computer executing a document management application, validity information associated with one or more electronic documents. The downloaded validity information may be synchronized, periodically or upon request, with validity information stored at the computer executing the document management application.

At operation 520, a scanner provided with the digital pen, scans a printed document. The scanning may be triggered by tapping the printed document with the writing tip of the digital pen. At operation 530, the validation module 430 of FIG. 4 identifies a background pattern (dot pattern) associated with the printed document and determines a document identification associated with an electronic document, based on the identified background pattern (operation 540). At operation 550, the validation module 430 determines, based on the document identification, a state of the electronic document that corresponds to the printed document. In one embodiment, the document identification is be mapped to validity information of the electronic document, such that the state of the electronic document may be determined by examining the validity information. The validity information may indicate that the electronic document is invalid, that an expiration date has been reached, that a later version of the electronic document is available, etc. The validity information may also include a mapping between a pen identification and access rights information that may be indicative of whether the user of the pen has sufficient rights to sign a printed version of the electronic document.

If, at operation 560, it is determined that the state of the electronic document is valid, the alert module 440 of FIG. 4 triggers an alert indicative of a valid document (e.g., a green light) at operation 562. If, at operation 560, it is determined that the state of the electronic document is not valid, the alert module 440 triggers an alert indicative of an invalid document (e.g., a red light) at operation 564. An alert may be an audio or a visual alert, as explained above.

Figure 6:
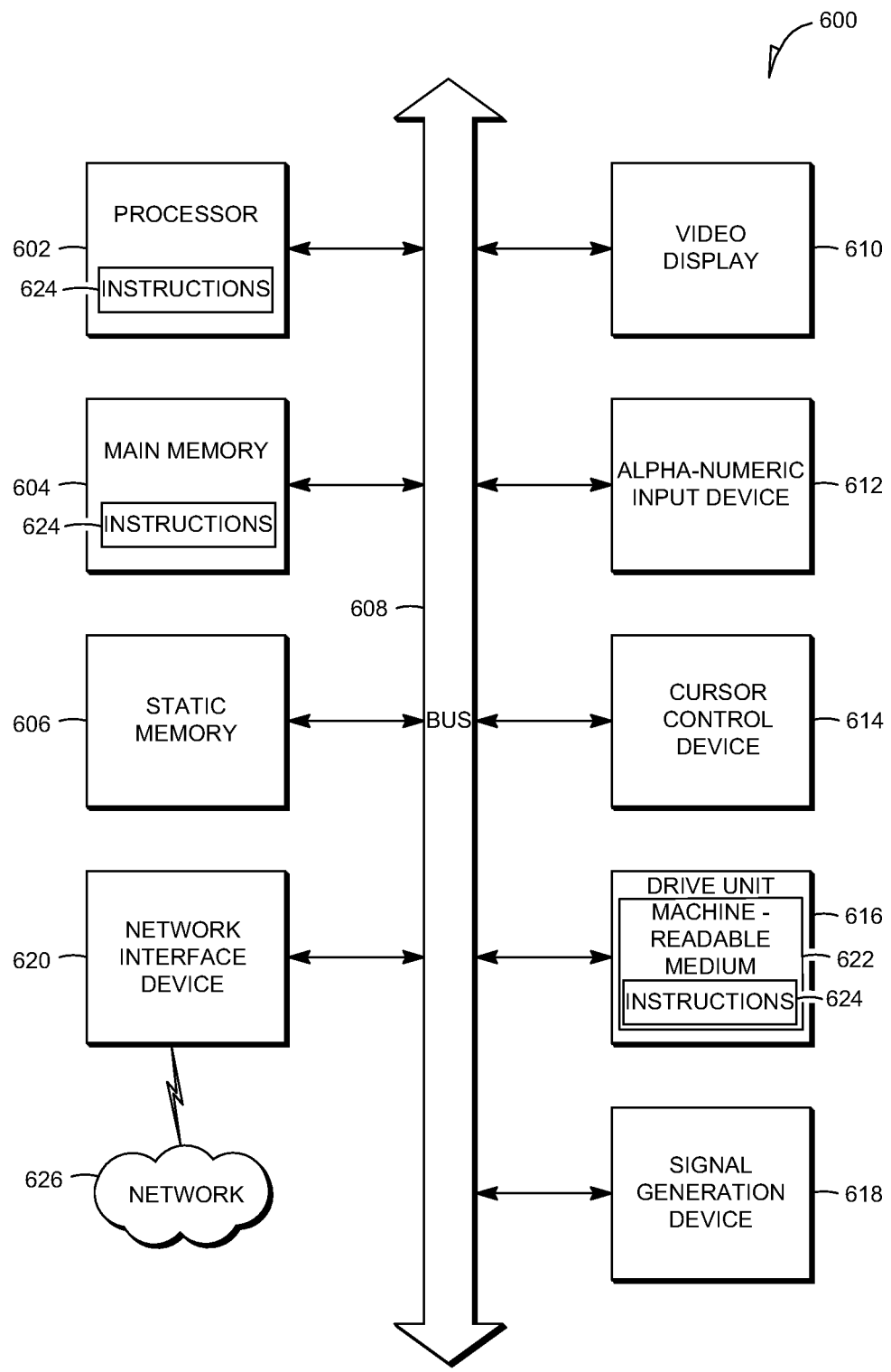
FIG. 6 is a diagrammatic representation of an example machine in the form of a computer system within which a set of instructions, for causing the machine to perform any one or more of the methodologies discussed herein, may be executed.

FIG. 6 shows a diagrammatic representation of a machine in the example form of a computer system 600 within which a set of instructions, for causing the machine to perform any one or more of the methodologies discussed herein, may be executed. In alternative embodiments, the machine operates as a stand-alone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 600 includes a processor 602 (e.g., a central processing unit (CPU), a graphics processing unit (GPU) or both), a main memory 604 and a static memory 606, which communicate with each other via a bus 606. The computer system 600 may further include a video display unit 610 (e.g., a liquid crystal display (LCD) or a cathode ray tube (CRT)). The computer system 600 also includes an alpha-numeric input device 612 (e.g., a keyboard), a user interface (UI) navigation device 614 (e.g., a cursor control device), a disk drive unit 616, a signal generation device 618 (e.g., a speaker) and a network interface device 620.

The disk drive unit 616 includes a machine-readable medium 622 on which is stored one or more sets of instructions and data structures (e.g., software 624) embodying or utilized by any one or more of the methodologies or functions described herein. The software 624 may also reside, completely or at least partially, within the main memory 604 and/or within the processor 602 during execution thereof by the computer system 600, with the main memory 604 and the processor 602 also constituting machine-readable media.

The software 624 may further be transmitted or received over a network 626 via the network interface device 620 utilizing any one of a number of well-known transfer protocols (e.g., Hyper Text Transfer Protocol (HTTP)).

While the machine-readable medium 622 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing and encoding a set of instructions for execution by the machine and that cause the machine to perform any one or more of the methodologies of embodiments of the present invention, or that is capable of storing and encoding data structures utilized by or associated with such a set of instructions. The term "machine-readable medium" shall accordingly be taken to include, but not be limited to, solid-state memories, optical and magnetic media. Such media may also include, without limitation, hard disks, floppy disks, flash memory cards, digital video disks, random access memory (RAMs), read only memory (ROMs), and the like.

The embodiments described herein may be implemented in an operating environment comprising software installed on a computer, in hardware, or in a combination of software and hardware. Such embodiments of the inventive subject matter may be referred to herein, individually or collectively, by the term "invention" merely for convenience and without intending to voluntarily limit the scope of this application to any single invention or inventive concept if more than one is, in fact, disclosed.

Thus, a method and system to determine validity of an electronic document has been described. Although embodiments have been described with reference to specific example embodiments, it will be evident that various modifications and changes may be made to these embodiments without departing from the broader spirit and scope of the inventive subject matter. Accordingly, the specification and drawings are to be regarded in an illustrative rather than a restrictive sense.

The invention claimed is:

1. A method executing in a pen-based computing system, the method comprising:
   scanning a printed document using a scanning device;
   identifying a background pattern in the printed document based on a result of the scanning;
   based on the background pattern, determining identification of an electronic document corresponding to the printed document;
   determining, using a processor, based on the identification of the electronic document, an electronic version of the electronic document; and
   triggering an alert, if the determined electronic version of the electronic document is an invalid electronic version of the electronic document.

2. The method of claim 1, the detecting comprises:
   accessing mapping information, the mapping information providing a mapping between the background pattern and the identification.

3. The method of claim 1, further comprising evaluating a validity flag associated with the electronic document.

4. The method of claim 1, further comprising evaluating expiration date data associated with the electronic document.

5. The method of claim 1, further comprising:
   determining a pen identification; and
   evaluating, based on the pen identification, signor information associated with the electronic document.

6. The method of claim 5, wherein the evaluating comprises:
   accessing unique mapping between the pen identification and a user identification; and
   determining rights associated with the user identification with respect to the electronic document.

7. The method of claim 1, comprising downloading, from a computer executing a document management application, data associated with the one or more electronic documents.

8. The method of claim 7, comprising synchronizing the downloaded data with data stored at the computer executing the document management application.

9. The method of claim 1, wherein the triggering of the alert comprises a visual alert or an audio alert.

10. The method of claim 1, further comprising stopping a flow of ink in an digital pen, the digital pen hosting the pen-based computing system.

11. A computer-implemented system comprising:
    a processor coupled to a memory;
    a background pattern detector to identify, using the processor, a background pattern associated with a printed document;
    a validation module to, using the processor:
       based on the background pattern, determine identification of an electronic document corresponding to the printed document,
       determine, based on the identification, an electronic version of the electronic document; and
    an alert module to trigger, using the processor, an alert, if the determined electronic version of the electronic document is an invalid electronic version of the electronic document.

12. The system of claim 11, wherein the validation module comprises:
    a mapping detector to access mapping information, the mapping information providing a mapping between the background pattern and the identification.

13. The system of claim 11, wherein the validation module is to evaluate a validity flag associated with the electronic document.

14. The system of claim 11, wherein the validation module is to evaluate expiration date data associated with the electronic document.

15. The system of claim 11, wherein the validation module is to:
    determine a pen identification; and
    evaluate, based on the pen identification, signor information associated with the electronic document.

16. The system of claim 11, wherein the validation module is to:
    access unique mapping between the pen identification and a user identification; and
    determine rights associated with the user identification with respect to the electronic document.

17. The system of claim 11, comprising a downloader to download, using the processor, from a computer executing a document management application, data associated with the one or more electronic documents.

18. The system of claim 17, comprising a synchronization module to synchronize, using the processor, the downloaded data with data stored at the computer executing the document management application.

19. The system of claim 11, wherein the alert module is to trigger a visual alert or an audio alert.

20. A machine-readable non-transitory storage medium having instruction data to cause a machine to:
    identify a background pattern associated with a printed document;
    based on the background pattern, determine identification of an electronic document corresponding to the printed document;
    determine, based on the identification, an electronic version of the electronic document; and
    trigger an alert, if the determined electronic version of the electronic document is an invalid electronic version of the electronic document.

* * * * *